(12) United States Patent
Kamo et al.

(10) Patent No.: US 10,686,189 B2
(45) Date of Patent: Jun. 16, 2020

(54) NEGATIVE ELECTRODE MATERIAL FOR NON-AQUEOUS ELECTROLYTE SECONDARY BATTERY, METHOD OF PRODUCING THE SAME, NEGATIVE ELECTRODE ACTIVE MATERIAL LAYER FOR NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

(71) Applicant: SHIN-ETSU CHEMICAL CO., LTD., Tokyo (JP)

(72) Inventors: Hiromichi Kamo, Takasaki (JP); Kohta Takahashi, Takasaki (JP); Takakazu Hirose, Annaka (JP); Masahiro Furuya, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1228 days.

(21) Appl. No.: 14/667,278

(22) Filed: Mar. 24, 2015

(65) Prior Publication Data
US 2015/0303468 A1 Oct. 22, 2015

(30) Foreign Application Priority Data
Apr. 22, 2014 (JP) .................................. 2014-87794

(51) Int. Cl.
*H01M 4/48* (2010.01)
*H01M 4/62* (2006.01)
(Continued)

(52) U.S. Cl.
CPC ........... *H01M 4/483* (2013.01); *H01M 4/485* (2013.01); *H01M 4/625* (2013.01); *H01M 4/366* (2013.01);
(Continued)

(58) Field of Classification Search
CPC .......... H01M 4/48; H01M 4/36; H01M 4/587; H01M 4/60; H01M 4/1391; H01M 4/0428; H01M 2004/027
See application file for complete search history.

(56) References Cited

U.S. PATENT DOCUMENTS 5,395,711 A 3/1995 Tahara et al.
7,459,236 B2 12/2008 Konishiike et al.
(Continued)

FOREIGN PATENT DOCUMENTS

CN 101609879 A 12/2009
JP 2997741 B2 1/2000
(Continued)

OTHER PUBLICATIONS

Feb. 28, 2014 Office Action issued in Japanese Patent Application No. 2014-087794.
(Continued)

*Primary Examiner* — Maria Laios
*Assistant Examiner* — Angela J Martin
(74) *Attorney, Agent, or Firm* — Oliff PLC

(57) ABSTRACT

The present invention provides a negative electrode material for a non-aqueous electrolyte secondary battery, comprising negative electrode active material particles containing a silicon compound expressed by $SiO_x$ at least partially coated with a carbon coating where $0.5 \leq x \leq 1.6$. The negative electrode active material particles have a negative zeta potential and exhibiting fragments of $C_yH_z$ compound in an outermost surface layer of the silicon compound when subjected to
(Continued)

TOF-SIMS. This negative electrode material can increase the battery capacity and improve the cycle performance and battery initial efficiency. The invention also provides a negative electrode active material layer, a negative electrode, and a non-aqueous electrolyte secondary battery using this material, and a method of producing this material.

18 Claims, 2 Drawing Sheets

(51) Int. Cl.
    *H01M 4/36*       (2006.01)
    *H01M 10/05*     (2010.01)
    *H01M 4/485*     (2010.01)
    *H01M 4/02*       (2006.01)
    *H01M 10/052*    (2010.01)

(52) U.S. Cl.
    CPC .... *H01M 10/052* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2009/0311606 | A1* | 12/2009 | Fukuoka ............... H01M 4/134 429/231.95 |
| 2013/0130113 | A1* | 5/2013 | Takano ................ H01M 4/131 429/223 |
| 2013/0149606 | A1 | 6/2013 | Yasuda et al. |
| 2013/0280614 | A1* | 10/2013 | Lee .................... H01M 4/0471 429/231.8 |
| 2014/0242458 | A1* | 8/2014 | Abe ..................... H01M 4/366 429/200 |
| 2017/0170468 | A1* | 6/2017 | Kawada ................ H01M 4/366 |

FOREIGN PATENT DOCUMENTS

| | | | | |
|---|---|---|---|---|
| JP | 2001185127 | A | | 7/2001 |
| JP | 2002042806 | A | | 2/2002 |
| JP | 2006114454 | A | | 4/2006 |
| JP | 2006164954 | A | | 6/2006 |
| JP | 2007234255 | A | | 9/2007 |
| JP | 2008177346 | A | | 7/2008 |
| JP | 2008251369 | A | | 10/2008 |
| JP | 2008282819 | A | | 11/2008 |
| JP | 2009070825 | A | | 4/2009 |
| JP | 2009205950 | A | | 9/2009 |
| JP | 2009212074 | A | | 9/2009 |
| JP | 2009301935 | A | | 12/2009 |
| JP | 2011076788 | A | * 4/2011 | ............ H01G 11/06 |
| JP | 2011090869 | A | | 5/2011 |
| JP | 2013145669 | | * 1/2012 | ............ H01M 4/62 |
| JP | 2013513206 | A | | 4/2013 |
| JP | 2013258032 | A | | 12/2013 |
| JP | 2016076292 | A | | 5/2016 |
| NO | 2012/026067 | A1 | | 3/2012 |
| WO | 2011068767 | A1 | | 6/2011 |
| WO | WO 2012108113 | | * 8/2012 | ............ H01M 4/48 |
| WO | WO 2014002883 | | * 1/2014 | ............ H01M 4/62 |

OTHER PUBLICATIONS

May 30, 2018 Office Action issued in Chinese Application No. 201510195155.
Jan. 4, 2019 Office Action issued in Chinese Application No. 201510195155.

\* cited by examiner

NEGATIVE ELECTRODE MATERIAL FOR NON-AQUEOUS ELECTROLYTE SECONDARY BATTERY, METHOD OF PRODUCING THE SAME, NEGATIVE ELECTRODE ACTIVE MATERIAL LAYER FOR NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

BACKGROUND OF THE INVENTION

1. Field of the Invention

The present invention relates to a negative electrode material for a non-aqueous electrolyte secondary battery, a method of producing the negative electrode material, a negative electrode active material layer for a non-aqueous electrolyte secondary battery, a negative electrode for a non-aqueous electrolyte secondary battery, and a non-aqueous electrolyte secondary battery.

2. Description of the Related Art

In Recent years, small electronic devices, represented by mobile terminals, have been widely used and urgently required to reduce the size and weight and to increase the life. Such requirement has advanced the development of particularly small, lightweight secondary batteries with higher energy density.

These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly accumulated on a current collector.

Use of silicon as a main material of a negative electrode active material, however, expands or shrinks a negative electrode active material particle when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial battery efficiency and the cycle performance.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium containing material is added to a negative electrode, and pre-doping that decompose lithium and moves the lithium to a positive electrode at a higher negative-electrode potential so that the first charge and discharge efficiency is improved (See Patent Document 6, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 0.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 cm$^{-1}$ and 1580 cm$^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve a higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

[Patent Document 1] Japanese Patent Application Publication No. 2001-185127
[Patent Document 2] Japanese Patent Application Publication No. 2002-042806
[Patent Document 3] Japanese Patent Application Publication No. 2006-164954
[Patent Document 4] Japanese Patent Application Publication No. 2006-114454
[Patent Document 5] Japanese Patent Application Publication No. 2009-070825
[Patent Document 6] Japanese Patent Application Publication No. 2013-513206
[Patent Document 7] Japanese Patent Application Publication No. 2008-282819
[Patent Document 8] Japanese Patent Application Publication No. 2008-251369
[Patent Document 9] Japanese Patent Application Publication No. 2008-177346
[Patent Document 10] Japanese Patent Application Publication No. 2007-234255
[Patent Document 11] Japanese Patent Application Publication No. 2009-212074
[Patent Document 12] Japanese Patent Application Publication No. 2009-205950
[Patent Document 13] Japanese Patent No. 2997741

SUMMARY OF THE INVENTION

As described previously, small electronic devices, represented by mobile terminals, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and it is an object of the present invention to provide a negative electrode material for a non-aqueous electrolyte secondary battery that can increase the battery capacity and improve the cycle performance and battery initial efficiency as well as a method of producing the negative electrode material, a negative electrode active material layer for a non-aqueous electrolyte secondary battery, a negative electrode for a non-aqueous electrolyte secondary battery, and a non-aqueous electrolyte secondary battery.

To achieve this object, the present invention provides a negative electrode material for a non-aqueous electrolyte secondary battery, comprising negative electrode active material particles containing a silicon compound expressed by $SiO_x$ at least partially coated with a carbon coating where $0.5 \leq x \leq 1.6$, the negative electrode active material particles having a negative zeta potential and exhibiting fragments of $C_yH_z$ compound in an outermost surface layer of the silicon compound when subjected to Time-of-Flight Secondary Ion Mass Spectrometry (TOF-SIMS).

Such a negative electrode material has adequate conductivity and better dispersiveness due to a surface charge when water slurry for producing a negative electrode is used, thereby enabling a negative electrode using this material to have excellent capacity maintenance rate and initial efficiency. In addition, the negative electrode material, which is mainly made of a silicon compound, can achieve a larger battery capacity.

The negative electrode active material particles preferably have a negative zeta potential ranging from −200 mV to −0.1 mV.

The negative electrode material including these negative electrode active material particles, which have the above range of zeta potential, can disperse evenly into a slurry in production of a negative electrode, thereby preventing uneven distribution of active material in the interior and improving the battery performances.

The negative electrode active material particles more preferably have a negative zeta potential ranging from −100 mV to −5 mV.

The negative electrode material including these negative electrode active material particles, which have the above range of zeta potential, can disperse more evenly into a slurry in production of a negative electrode, thereby preventing uneven distribution of active material in the interior and improving the battery performances more reliably.

A part of the fragments of $C_yH_z$ compound exhibited by the negative electrode active material particles during the TOF-SIMS preferably satisfies $6 \leq y \leq 2$ and $2y+2 \geq z \geq 2y-2$.

The surface on which the fragments of $C_yH_z$ compound are detected is compatible with a binder, resulting in better battery performances.

The ratio of a $C_4H_9$ detected intensity D to a $C_3H_5$ detected intensity E of the fragments of $C_yH_z$ compound exhibited by the negative electrode active material particles during the TOF-SIMS preferably satisfies $2.5 \geq D/E \geq 0.3$.

When the intensity ratio D/E is 2.5 or less, electrical resistance of the surface can be prevented from becoming too large and the battery performances are prevented from degrading; when the intensity ratio D/E is 0.3 or more, the conductivity is improved over the entire surface due to the carbon coating because a sufficient area of the surface is coated with the carbon coating. The battery performances can consequently be improved.

The silicon compound preferably satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-Magic Angle Spinning (MAS)-Nuclear Magnetic Resonance (NMR) spectrum.

An amorphous silicon (also referred to as a-Si below) can inhibit the expansion of a negative electrode due to the insertion of lithium. As the amorphous silicon content becomes higher, the expansion of the negative electrode is inhibited more effectively, so the maintenance rate is improved. The silicon compound satisfying the formula (1) prevents the ratio of a silica ($SiO_2$) component to a silicon (Si) component, such as an amorphous silicon or a crystalline silicon (also referred to as c-Si below), from becoming too large, and inhibits reduction in electronic conductivity in its particle, thereby inhibiting the degradation of the battery performances.

Each negative electrode active material particle preferably satisfies $3.00 \geq F/G \geq 0.05$ when subjected to X-ray photoelectron spectroscopy (XPS) on its surface layer where F is a peak area of a peak when a C1s orbital binding energy attributable to C=O bond is about $287.5 \pm 1.0$ eV, and G is a peak area of a peak when a C1s orbital binding energy attributable to C=C bond is about $284.0 \pm 1.0$ eV.

When the above relationship exists between the peak area F for a binding energy of about $287.5 \pm 1.0$ eV and the peak area G for a binding energy of about $284.0 \pm 1.0$ eV in XPS, a carboxyl group on the surface of the silicon compound improves adhesion between the silicon compound and a binder in a negative electrode, resulting in improved battery performances. The $287.5 \pm 1.0$ eV binding energy is attributable to the carboxyl group; the $284.0 \pm 1.0$ eV binding energy is attributable to elemental carbon.

The carbon coating on the silicon compound preferably exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$.

The silicon compound satisfying the above intensity ratio can have the optimum ratio of a carbon material with the diamond structure to a carbon material with the graphite structure in the carbon coating, thereby enabling improvement in the battery performances.

The silicon compound preferably exhibits a diffraction peak having a half width ($2\theta$) of $1.2°$ or more, the diffraction peak being attributable to an Si(111) crystal face and obtained when X-ray diffraction is performed on the silicon compound, and a crystallite size attributable to the crystal face is 7.5 nm or less.

This silicon compound, which exhibits the above half width and crystallite size, has low crystallinity. Use of the silicon compound having low crystallinity, which has a few Si crystal, enables improvement in the battery performances.

The negative electrode active material particles preferably have a median diameter ranging from 0.5 μm to 20 μm.

Such negative electrode active material particles can improve the capacity maintenance rate and cycle performance.

The amount of the carbon coating is preferably 20 mass % or less with respect to the total amount of the silicon compound and the carbon coating.

Such a negative active material can improve electrical conductivity. If the content of the carbon coating is 20 mass % or less, the deterioration of the battery performances and the reduction in battery capacity can be prevented.

The average thickness of the carbon coating on the silicon compound is preferably in the range from 1 nm to 5000 nm.

The negative electrode active material particles containing the carbon coating having an average thickness of 1 nm or more enable improvement in conductivity; those containing the carbon coating having an average thickness of 5000 nm or less enable a lithium-ion secondary battery using these negative electrode active material particles as the negative electrode active material to inhibit reduction in battery capacity.

The average thickness of the carbon coating on the silicon compound is more preferably in the range from 5 nm to 500 nm.

The negative electrode active material particles containing the carbon coating having this range of thickness can improve the conductivity and inhibit the reduction in battery capacity more effectively.

The average coverage of the carbon coating on the silicon compound is preferably 30% or more.

This average coverage enables a non-aqueous electrolyte secondary battery using the negative active material containing these negative electrode active material particles to have better cycle performance and better initial charge and discharge performance.

The carbon coating is preferably formed by pyrolyzing a compound containing carbon.

Such a carbon coating has excellent conductivity.

Furthermore, the present invention provides a negative electrode active material layer for a non-aqueous electrolyte secondary battery, comprising any one of the above negative electrode materials and a carbon material contained in the negative electrode material.

The negative electrode active material layer composed of the inventive negative electrode material and a carbon material (a carbon active material) can reduce its electrical resistance and a stress due to its expansion at charging, providing excellent cycle performance.

Furthermore, the present invention provides a negative electrode for a non-aqueous electrolyte secondary battery, comprising any one of the above negative electrode materials.

The negative electrode composed of any one of the above negative electrode materials provides excellent battery performances.

Furthermore, the present invention provides a non-aqueous electrolyte secondary battery using the above negative electrode.

Such a non-aqueous electrolyte secondary battery has excellent battery performances.

Furthermore, the present invention provides a method of producing a negative electrode material for a non-aqueous electrolyte secondary battery, the negative electrode material comprising negative electrode active material particles containing a silicon compound expressed by SiO$_x$ at least partially coated with a carbon coating where $0.5 \leq x \leq 1.6$, the method comprising: producing carbon-coated silicon compounds by performing thermal chemical vapor deposition (CVD) on silicon compounds expressed by SiO$_x$ where $0.5 \leq x \leq 1.6$; evaluating whether the carbon-coated silicon compounds exhibit fragments of C$_y$H$_z$ compound in their outermost surface layer when subjected to Time-of-Flight Secondary Ion Mass Spectrometry (TOF-SIMS); measuring a zeta potential of the carbon-coated silicon compounds; selecting a carbon-coated silicon compound exhibiting the fragments of C$_y$H$_z$ compound in its outermost surface layer in the evaluation and a negative zeta potential in the measurement from the produced carbon-coated silicon compounds; and using the selected carbon-coated silicon compound for the negative electrode active material particles to produce the negative electrode material.

Such a method can produce a negative electrode material, for use in a non-aqueous electrolyte secondary battery, having adequate conductivity and better dispersiveness when water slurry is used. This negative electrode material enables a negative electrode using this material to have excellent capacity maintenance rate and initial efficiency.

A gas species to be used and temperature in the thermal CVD may be adjusted such that the carbon-coated silicon compound exhibiting the fragments of C$_y$H$_z$ compound in its outermost surface layer when subjected to TOF-SIMS and having a negative zeta potential is produced.

This adjustment can readily modify the surface status of the carbon-coated silicon compound so that the carbon-coated silicon compound exhibits the fragments of $C_yH_z$ compound in its outermost surface layer and a negative zeta potential, thereby enabling the method to more reliably produce a negative electrode material that allows a non-aqueous electrolyte secondary battery using this material for a negative electrode to have excellent capacity maintenance rate and initial efficiency.

As described above, the inventive negative electrode material allows a non-aqueous electrolyte secondary battery using this material to have higher capacity, better cycle performance, and better initial charge and discharge performance. The inventive method can produce a negative electrode material for a non-aqueous electrolyte secondary battery having excellent cycle performance and excellent initial charge and discharge performance. The inventive negative electrode active material layer, negative electrode, non-aqueous electrolyte secondary battery using the inventive negative electrode material can achieve better cycle performance and better initial charge and discharge performance.

In addition, electronic devices, machine tools, electric vehicles, and power storage systems, etc., using the inventive secondary battery can achieve the same effect.

DETAILED DESCRIPTION OF THE PREFERRED EMBODIMENTS

Hereinafter, embodiments of the present invention will be described, but the present invention is not restricted to these embodiments.

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have the same cycle performance as a non-aqueous electrolyte secondary battery using a carbon material; however, no one has yet proposed a negative electrode material for this type of battery having the same cycle stability as a non-aqueous electrolyte secondary battery using a carbon material. In addition, a silicon compound especially containing oxygen has a lower initial efficiency than that of any carbon material, thereby limiting improvement in battery capacity.

In view of this, the present inventors diligently conducted study on a negative active material that allows a non-aqueous secondary battery using a negative electrode made of this material to have better cycle performance and initial efficiency, bringing the present invention to completion.

The inventive negative electrode material for a non-aqueous electrolyte secondary battery includes a silicon compound expressed by $SiO_x$ at least partially coated with a carbon coating where $0.5 \leq x \leq 1.6$, and exhibits a negative zeta potential and fragments of $C_yH_z$ compound in the outermost surface layer when subjected to TOF-SIMS.

Embodiments of the present invention will be specifically described with reference to the figures, but the present invention is not restricted to these embodiments.

<1. Negative Electrode for Non-Aqueous Electrolyte Secondary Battery>

Figure 1:
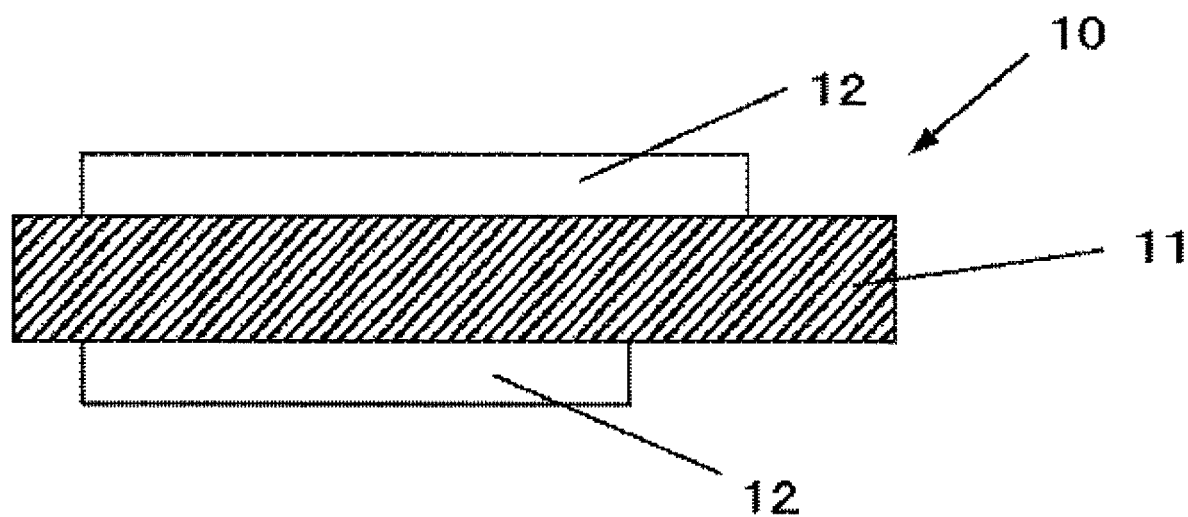
FIG. 1 is a schematic cross-sectional view of a configuration of a negative electrode for a non-aqueous electrolyte secondary battery according to an embodiment of the invention.

A negative electrode for a non-aqueous electrolyte secondary battery using the inventive negative electrode material for a non-aqueous electrolyte secondary battery (simply referred to as the inventive negative electrode material below) will now be described. FIG. 1 shows the cross-section of a negative electrode for a non-aqueous electrolyte secondary battery (simply referred to as a negative electrode below) according to an embodiment of the invention.

[Configuration of Negative Electrode]

As shown in FIG. 1, the negative electrode 10 has a negative electrode active material layer 12 on a negative-electrode current collector 11. The negative electrode active material layer 12 may be disposed on one side or both sides of the negative-electrode current collector 11. The negative-electrode current collector 11 is not necessarily needed in a negative electrode using the inventive negative electrode material.

[Negative-Electrode Current Collector]

The negative-electrode current collector 11 is made of a highly conductive and mechanically strong material. Examples of the conductive material used for the negative-electrode current collector 11 include copper (Cu) and nickel (Ni). Such conductive materials preferably have inability to form an intermetallic compound and lithium (Li).

The negative-electrode current collector 11 preferably contains carbon (C) and sulfur (S) other than a main element. The reason is as follows: these elements improve the physical strength of the current collector; the current collector including the above elements, particularly when the active material layer contains a material expandable at charging, can inhibit deformation of the electrodes and the current collector itself. The content of the above elements is preferably, but not particularly limited to, 100 ppm or less. This content enables the deformation to be effectively inhibited.

The surface of the negative-electrode current collector 11 may or may not be roughed. Examples of the negative-electrode current collector roughened include a metallic foil subjected to an electrolyzing process, an embossing process, or a chemical etching process. Examples of the negative-electrode current collector that is not roughened include a rolled metallic foil.

[Negative Electrode Material and Negative Electrode Active Material Layer]

The negative electrode active material layer 12 contains a particulate negative electrode material that can occlude and emit lithium ions and may further contain other materials such as a negative-electrode binder or a conductive additive depending on battery design. The inventive negative electrode material includes the negative electrode active material layer 12.

The negative electrode active material particles used for the inventive negative electrode material each contain a silicon compound that can occlude and emit lithium ions and a lithium compound contained in the silicon compound. The silicon compound may contain a lithium compound on its surface, as described below. The structure of the silicon compound is observed by, for example, photography of transmission electron microscope-energy dispersive X-ray spectroscopy (TEM-EDX), or electron energy loss spectroscopy (EELS).

The negative electrode active material particle contained in the inventive negative electrode material is a silicon oxide containing a silicon compound ($SiO_x$, where $0.5 \leq x \leq 1.6$); a preferable composition of the silicon compound is that x is close to 1. The reason is that this composition enables high cycle performance. The present invention does not necessarily intend a silicon material composition of 100% but permits a silicon material containing a minute amount of impurities.

The inventive negative electrode material has a negative zeta potential, as described previously. The negative zeta potential can be measured by the following procedure.

First, 1% of the negative electrode active material particles composed of the silicon compound are added to 0.1% of a carboxymethyl cellulose solution (CMC). Next, this mixture is stirred for 30 seconds with a hand mixer. Finally, the resultant placed in an ultrasonic bath for 10 minutes to measure the zeta potential at 25° C. The measurement obtains electrophoretic mobility from which the zeta potential can be calculated with the Smoluchowski equation.

Solution: 1% of a silicon compound; 0.1% of a CMC aqueous solution (a usable CMC is, for example, CELLOGEN WS-C made by DKS Co., Ltd.)

Measurement Apparatus: ELSZ-1000Z made by Otsuka Electronics Co., Ltd.

In the invention, the zeta potential of the negative electrode material is preferably in the range from −200 mV to −0.1 mV, more preferably from −100 mV to −5 mV.

The negative electrode active material particles having a negative zeta potential are dispersed evenly into a water slurry. If the absolute value of the negative zeta potential is 0.1 or more, these negative electrode active material particles hardly cohere into a lump thereof in a water slurry, thereby enabling the inhibition of the degradation of battery performances; if this absolute value is 200 or less, each negative electrode active material particle can prevent excessive repulsive force against the other particles, thereby preventing uneven active material distribution in a negative electrode and inhibiting the degradation of battery performances.

The zeta potential can be adjusted by changing CVD conditions, such as a gas species and temperature, and subsequent process conditions.

The inventive negative electrode material exhibits fragments of $C_yH_z$ compound in the outermost surface layer when subjected to TOP-SIMS, as described previously. These fragments can be detected, for example, under the following conditions.

PHI TRIFT 2 made by ULVAC-PHI Inc.
Primary Ion Source: Ga
Sample Temperature: 25° C.
Accelerating Voltage: 5 kV
Spot Size: 100 μm×100 μm
Sputter: Ga; 100 μm×100 μm; 10 seconds
Negative Ion Mass Spectrum
Sample: pressed powder pellet The fragments of $C_yH_z$ compound are derived from a carbon coating deposited on the surface of the negative electrode active material particle by CVD. The surface on which these fragments are detected is compatible with a binder such as CMC or polyimide, resulting in improved battery performances.

The fragments of $C_yH_z$ compound preferably include those satisfying $6 \geq y \geq 2$ and $2y+2 \geq z \geq 2y-2$.

The surface on which the fragments of this type are detected is more compatible with the binder, resulting in much more improved battery performances.

Among the fragments of $C_yH_z$ compound detected by TOF-SIMS, the fragments of $C_4H_9$ and $C_3H_5$ preferably satisfy $2.5 \geq D/E \geq 0.3$ where D is the detected intensity of $C_4H_9$ and E is the detected intensity of $C_3H_5$.

When the intensity ratio D/E is 2.5 or less, electrical resistance of the surface can be prevented from becoming too large and the degradation of battery performances can be prevented; when the intensity ratio D/E is 0.3 or more, the conductivity is improved over the entire surface due to the carbon coating because a sufficient area of the surface is coated with the carbon coating. The battery performances can consequently be improved.

The silicon compound preferably satisfies the following formula (1):

$$5.02 \geq A/B \geq 0.01 \text{ and } 6.0 \geq (A+B)/C \geq 0.02 \quad (1)$$

where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}Si$-Magic Angle Spinning (MAS)-Nuclear Magnetic Resonance (NMR) spectrum.

As the content of the amorphous silicon, which can inhibit the expansion of a negative electrode due to the insertion of lithium, becomes higher, the expansion of the negative electrode is inhibited more effectively, so the maintenance rate is improved. The silicon compound satisfying the formula (1) prevents the ratio of a silica ($SiO_2$) component to a silicon (Si) component, such as an amorphous silicon or a crystalline silicon, from becoming too large, and inhibits reduction in electronic conductivity in its particle, thereby inhibiting the degradation of the battery performances.

The $^{29}Si$-MAS-NMR spectrum can be measured by, for example, the following conditions.

$^{29}Si$-MAS-NMR
Apparatus: a 700-NMR spectroscope made by Bruker Corp.
Probe: a 4-mm-HR-MAS rotor, 50 μL
Sample Rotation Speed: 10 kHz
Temperature of Measurement Environment: 25° C.

Each negative electrode active material particle preferably satisfies $3.00 \geq F/G \geq 0.05$ when subjected to XPS on its surface layer, where F is a peak area of a peak at a binding energy of about 287.5±1.0 eV of the C1s orbital of carbon, and G is a peak area of a peak at binding energy of about 284.0±1.0 eV of the C1s orbital of carbon. The 287.5±1.0 eV binding energy is attributable to C=O double bond; the 284.0±1.0 eV binding energy is attributable to C=O double bond. The XPS measurement can be performed, for example, under the following conditions.

Apparatus: an X-ray photoelectron spectroscopy apparatus
X-ray Source: a monochromatic Al—Kα ray
X-ray Spot Diameter: 100 μm
Ar-ion Sputtering Gun Conditions: 0.5 kV, 2 mm×2 mm A carboxyl group on the surface of the silicon compound improves adhesion between the silicon compound and a binder in a negative electrode, when the above relationship exists between the peak area F for a binding energy of about 287.5±1.0 eV, which is attributable to the carboxyl group, and the peak area G of the peak for a binding energy of about 284.0±1.0 eV, which is attributable to elemental carbon. This improves the battery performances.

In the invention, the carbon coating on the silicon compound preferably exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$.

Examples of the method of forming the carbon coating include coating the silicon compound with a carbon material such as graphite or a carbon compound.

The Raman spectrometry will now be described in detail. The Raman spectrometry, micro-Raman analysis, can obtain the ratio of a carbon material with the diamond structure such as a carbon coating or a carbon active material to a carbon material with the graphite structure, from the Raman spectrum. More specifically, diamond exhibits a sharp peak at a Raman shift of 1330 cm$^{-1}$; graphite exhibits a sharp peak at a Raman shift of 1580 cm$^{-1}$. The ratio of the carbon material with the diamond structure to one with the graphite structure can be readily obtained from the ratio of the intensity of these peaks.

Diamond has high strength, high density, and are highly insulating; graphite is excellent in conductivity. The carbon coating exhibiting the above range of the intensity ratio $I_{1133}/I_{1580}$ makes the best use of both properties of diamond and graphite, thereby enabling the negative electrode to prevent from breaking due to the expansion and contraction of its material at charging and discharging. This negative electrode material has an excellent conductive network.

The amount of the carbon coating is preferably 20 mass % or less with respect to the total amount of the silicon compound and the carbon coating. The amount of the carbon coating is more preferably 15 mass % or less and more than 0 mass %.

The negative active material including such a carbon coating can improve electrical conductivity. If the amount of the carbon coating is 20 mass % or less, the deterioration of the battery performances and the reduction in battery capacity can be prevented. The coating method with a carbon coating is preferably, but not particularly limited to, sugar carbonization or pyrolysis of hydrocarbon gas, for these methods can improve the carbon coverage.

The average coverage of the carbon coating on the silicon compound is preferably 30% or more.

This range of average coverage allows the silicon compound to have sufficient electronic conductivity, resulting in better battery performances.

The average thickness of the carbon coating on the silicon compound of the inventive negative electrode material is preferably in the range from 1 nm to 5000 nm, more preferably in the range from 5 nm to 500 nm.

The negative electrode active material particles containing the carbon coating having an average thickness of 1 nm or more enable improvement in conductivity; those containing the carbon coating having an average thickness of 5000 nm or less enable a lithium-ion secondary battery using these negative electrode active material particles as the negative electrode active material to inhibit the reduction in battery capacity.

A lower crystallinity of the silicon compound contained in the inventive negative electrode is better. More specifically, the silicon compound preferably exhibits a diffraction peak having a half width (2θ) of 1.2° or more that is attributable to an Si(111) crystal face and obtained when X-ray diffraction is performed on the silicon active material, and a crystallite size of 7.5 nm or less that is attributable to the crystal face.

The inventive negative electrode, which contains the silicon compound with low crystallinity, can improve the battery performances and produce stable lithium compounds.

The median diameter of the silicon active material particles is preferably in the range from 0.5 μm to 20 μm, but not particularly limited thereto.

This range makes it easy to occlude and emit lithium ions and inhibits the breakage of the particles at charging and discharging. A median diameter of 0.5 μm or more then prevents the silicon active material surface from increasing and can thus reduce the battery irreversible capacity; a median diameter of 20 μm or less preferably inhibits the breakage of the particles and the creation of a new surface.

The inventive negative electrode active material layer 12 shown in FIG. 1 may be produced by adding a negative-electrode conductive additive into the inventive negative electrode material.

An example of the negative-electrode conductive additive is a carbon material (a carbon active material) selected from the group consisting of carbon black, acetylene black, graphite such as flaky graphite, ketjen black, carbon nanotube, carbon nanofiber, or the combination thereof. These conductive additives are preferably particles having a median diameter smaller than that of the silicon compound.

The inventive negative electrode active material layer 12 may be produced with a mixture of the inventive negative electrode material including the negative electrode active material particles and a carbon material (a carbon active material). In this manner, the negative electrode active material layer 12 can reduce its electrical resistance and a stress due to its expansion at charging. Examples of the carbon active material include pyrolytic carbons, cokes, glassy carbon fiber, a fired organic polymeric compound, and carbon black.

If the carbon active material is contained, the mass ratio of the silicon compound to the carbon active material is preferably equal to or more than 5% and less than 90%. The negative electrode including the negative electrode active material layer of this type prevents reduction in the first efficiency and capacity maintenance rate.

The negative electrode active material layer 12 may be formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode Material and Negative Electrode]

The inventive method of producing a negative electrode material for a non-aqueous electrolyte secondary battery will be now described.

A raw material capable of generating a silicon oxide gas is first heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relation of 0.8 < metallic silicon powder/silicon dioxide powder < 1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an absorption plate. The temperature in the reactor is decreased to 100° C.

or less and then a deposit is taken out. The deposit is pulverized with a ball mill or a jet mill to form powder so that a silicon compound expressed by $SiO_x$ (where $0.5 \leq x \leq 1.6$) can be obtained.

The obtained silicon compound is coated with a carbon coating to obtain a carbon-coated silicon compound.

Thermal chemical vapor deposition (CVD) is used to coat the obtained silicon compound with the carbon layer and thereby to obtain the carbon-coated silicon compound.

This thermal CVD is to fill a furnace in which the silicon compound is placed with a hydrocarbon gas and heat the interior of the furnace such that the hydrocarbon gas is pyrolyzed, thereby coating the silicon compound with the carbon layer. The pyrolysis temperature is preferably, but not particularly limited to, 1200° C. or less, more preferably 950° C. or less. This temperature range enables the inhibition of the disproportionation of the silicon compound.

The produced carbon-coated silicon compound is evaluated whether this compound exhibits fragments of $C_yH_z$ compound in their outermost surface layer when subjected to Time-of-Flight Secondary Ion Mass Spectrometry (TOF-SIMS). In addition, the zeta potential of the carbon-coated silicon compound is measured. The evaluation of the presence of fragments and the measurement of the zeta potential can be performed in the above-described manner.

The purpose of the evaluation of the presence of fragments and the measurement of the zeta potential is to select a carbon-coated silicon compound exhibiting the fragments of $C_yH_z$ compound in its outermost surface layer and a negative zeta potential from the produced carbon-coated silicon compounds. The selected carbon-coated silicon compound is used as the negative electrode active material particles to produce a negative electrode material for a non-aqueous electrolyte secondary battery.

The gas species to be used and the temperature in the thermal CVD is preferably adjusted so as to produce the carbon-coated silicon compound exhibiting the fragments of $C_yH_z$ compound in its outermost surface layer when subjected to TOF-SIMS and having a negative zeta potential.

Adjusting the conditions in the thermal CVD such as the gas species and temperature makes the inventive negative electrode material easy to produce.

In addition, the thermal CVD to coat the silicon compound with the carbon coating can be performed, for example, while the pressure and temperature in the furnace are adjusted. This adjustment allows the carbon coating on the silicon compound to have a desired ratio of the scattering peak intensity in Raman spectrometry.

The hydrocarbon gas, which is a raw material of the carbon coating, preferably has a composition of CnHm where $3 \geq n$, but is not particularly limited thereto, for this composition enables reduction in production cost and improvement in physical properties of a pyrolysis product.

The selection of the carbon-coated silicon compound is not necessarily needed in every production of the negative electrode material. Once a carbon-coated silicon compound exhibiting the fragments of $C_yH_z$ compound in the $C_yH_z$ compound fragments evaluation and a negative zeta potential in the zeta potential measurement is selected, that is, once conditions under which the target negative electrode material is produced are found, future production of the negative electrode material can be performed under the found conditions.

A method of producing the inventive negative electrode will now be described.

The negative electrode active material particles obtained in the above manner are mixed with a binder and a solvent to form slurry. The slurry is applied to the surface of the negative-electrode current collector and dried to form a negative electrode active material layer so that the negative electrode is produced.

If a carbon active material having a median diameter smaller than that of the silicon compound is contained in the negative electrode active material layer, acetylene black, for example, can be added as the carbon active material.

A negative-electrode current collector containing carbon and sulfur in an amount of 90 ppm or less is more effective.

<2. Lithium-Ion Secondary Battery>

A lithium-ion secondary battery using a negative electrode including the inventive negative electrode material for a non-aqueous electrolyte secondary battery will now be described.

[Configuration of Laminate Film Secondary Battery]

Figure 2:
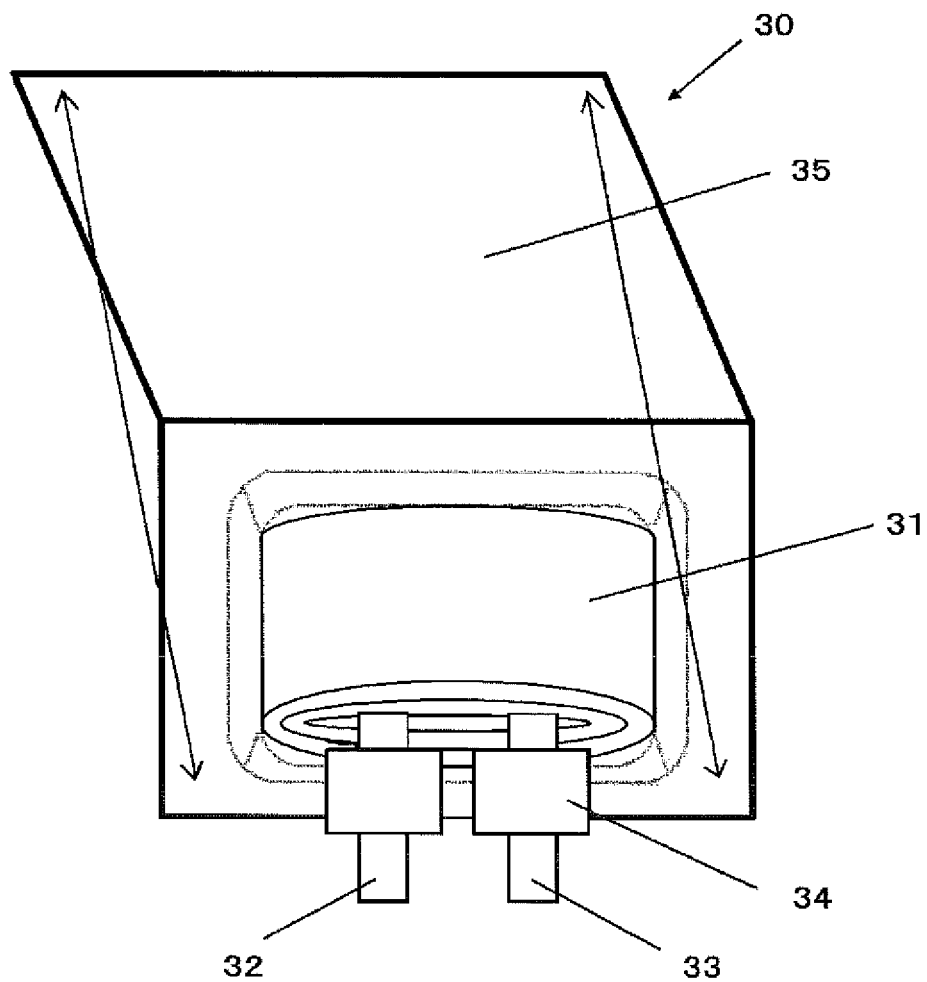
FIG. 2 is an exploded view of a laminate film type of secondary battery according to an embodiment of the invention.

The laminate film secondary battery 30 shown in FIG. 2 includes a wound electrode body 31 interposed between sheet-shaped outer parts 35. The wound electrode body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer aluminum foil; the protecting layer nylon.

The space between the outer parts 35 and the positive and negative electrodes is filled with close adhesion films 34 to prevent air from entering therein. Exemplary materials of the close adhesion films include polyethylene, polypropylene, and polyolefin.

[Positive Electrode]

The positive electrode has a positive electrode active material layer disposed on one side or both sides of a positive-electrode current collector as in the negative electrode 10, for examples, shown in FIG. 1.

The positive-electrode current collector is made of, for example, a conductive material such as aluminum.

The positive electrode active material layer contains a material that can occlude and emit lithium ions or the combination thereof, and may contain a binder, a conductive additive, a dispersing agent, or other materials according to design. The same detailed description as described for the negative-electrode binders and negative-electrode conductive additive, for example, is then given for this binder and this conductive additive.

The positive electrode material is preferably a compound containing lithium. Examples of this compound include a complex oxide composed of lithium and transition metal elements, and a phosphoric acid compound composed of lithium and transition metal elements. Among them, a compound including at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \le x \le 1.10$ and $0.05 \le y \le 1.10$.

Examples of the complex oxide composed of lithium and transition metal elements include a lithium cobalt complex oxide ($Li_xCoO_2$), a lithium nickel complex oxide ($Li_xNiO_2$).

Examples of the phosphoric acid compound composed of lithium and transition metal elements include a lithium iron phosphoric acid compound ($LiFePO_4$), a lithium iron manganese phosphoric acid compound ($LiFe_{1-u}Mn_uPO_4(u<1)$). Use of these positive electrode materials enables a higher battery capacity and excellent cycle performance.

[Negative Electrode]

The negative electrode is configured as in the above negative electrode 10 for a lithium-ion secondary battery shown in FIG. 1, and has the negative electrode active material layer 12, for example, on both faces of the current collector 11. The negative electrode preferably has a negative-electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive-electrode current collector. The same is true of the negative electrode active material layer. Such a negative electrode may have, for example, an area at which the positive electrode active material layer is not present on the surface of the positive-electrode current collector that the negative electrode active material layer faces. This area permits stable battery design.

The above area at which the positive and negative electrode active material layers do not face one another, a non-facing area, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-Dimethoxyethane, and tetrahydrofuran.

Among these, ethylene carbonate, propylene carbonate, dimethyl carbonate, diethyl carbonate, or ethylmethyl carbonate, or the combination thereof is particularly preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed electrode, the solvent preferably contains a halogenated chain carbonic acid ester, or a halogenated cyclic carbonic acid ester. Such a solvent enables the negative electrode active material to be coated with a stable coating at discharging and particularly charging. The halogenated chain carbonic acid ester is a chain carbonic acid ester including halogen, in which at least one hydrogen atom is replaced by a halogen atom. The halogenated cyclic carbonic acid ester is a cyclic carbonic acid ester including halogen, in which at least one hydrogen atom is replaced by a halogen atom.

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonic acid ester include carbonic acid fluoromethylmethyl ester, and carbonic acid methyl(difluoromethyl) ester. Examples of the halogenated cyclic carbonic acid ester include 4-fluoro-1,3-dioxolan-2-one or 4,5-difluoro-1,3-dioxolane-2-one.

The solvent preferably contains an unsaturated carbon bond cyclic carbonate as an additive, for this enables the formation of a stable coating on an electrode at charging and discharging and the inhibition of a decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of a battery. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably in the range from 0.5 mol/kg to 2.5 mol/kg. This content enables high ionic conductivity.

[Manufacture of Laminate Film Secondary Battery]

Firstly, a positive electrode is produced with the above positive-electrode material as follows. A positive-electrode mixture is created by mixing the positive-electrode material with as necessary the binder, the conductive additive, and other materials, and dispersed in an organic solvent to form slurry of the positive-electrode mixture. This slurry is then applied to a positive-electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression and heating may be repeated many times.

Secondly, a negative electrode active material layer is formed on a negative-electrode current collector to produce a negative electrode through the same procedure as in the above production of the negative electrode 10 for a lithium-ion secondary battery.

The positive electrode and the negative electrode are produced in the same way as above. When these electrodes are produced, the active material layers are formed on both faces of the positive- and negative-electrode current collector. In both the electrodes, the length of these active material layers formed on the faces may differ from one another (See FIG. 1).

Finally, the following steps are carried out in the order described. An electrolyte is adjusted. With ultrasonic welding, the positive-electrode lead 32 is attached to the positive-electrode current collector and the negative-electrode lead 33 is attached to the negative-electrode current collector. The positive and negative electrodes and the separator interposed therebetween are stacked or wound to produce the electrode body 31 and a protecting tape is stuck to the outermost circumference of the body. The electrode body is flattened. The film-shaped outer part 35 is folded in half to interpose the electrode body therebetween. The outer edge of the half parts is stuck to one another by heat sealing such that one of the four sides is opened to enter the electrode body therefrom. The close adhesion films are inserted between the outer part and the positive- and negative-electrode leads. The above adjusted electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLES

The present invention will be more specifically described below with reference to examples and Comparative examples, but is not restricted to these examples.

Example 1-1

The laminate film secondary battery 30 shown in FIG. 2 was produced by the following procedure.

The procedure began with the production of a positive electrode. Positive electrode active materials of 95 mass parts of $LiCoO_2$ (lithium cobalt complex oxide), 2.5 mass parts of positive-electrode conductive additive, and 2.5 mass parts of positive-electrode binders (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive-electrode current collector with a coating apparatus having a die head and dried with a drying apparatus of hot-air type. The positive-electrode current collector had a thickness of 15 μm. The resultant was finally compressed with a roll press.

Next a negative electrode was produced. A mixed raw material of metallic silicon and silicon dioxide was placed in a reactor to accumulate a silicon compound under a vacuum of 10 Pa. The silicon compound was sufficiently cooled and then taken out to pulverize the silicon compound with a ball mill. After adjustment of the particle diameter of this silicon compound, the thermal CVD using a methane-gas raw material was performed to obtain a carbon-coated silicon compound, which had a carbon coating. After the thermal CVD, the carbon-coated silicon compound was subjected to a firing process at 1000° C. The produced carbon-coated silicon compound was bulk-modified by the electrochemical method in a mixed solvent having a propylene-carbonate-to-ethylene-carbonate volume ratio of 1:1, including 1.3 mol/kg of electrolyte salt. The resultant carbon-coated silicon compound was dried in a carbon atmosphere as need. In this manner, negative electrode active material particles were obtained.

The negative electrode active material particles, a precursor of a negative-electrode binder, a first conductive additive, a second conductive additive were mixed at a dry-weight ratio of 80:8:10:2. The mixture was diluted with N-methyl-2-pyrrolidone (NMP) to form paste slurry of a negative-electrode mixture. The precursor was a polyamic-acid. The NMP was used as a solvent for the precursor. The negative-electrode mixture slurry was then applied to both surfaces of a negative-electrode current collector with a coating apparatus and dried. The negative-electrode current collector used was an electrolytic copper foil, having a thickness of 15 μm. The resultant negative-electrode current collector was fired under a vacuum at 400° C. for 1 hour. This process formed a polyimide negative-electrode binder from the precursor.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to produce an electrolyte. The composite of the solvent was FEC:EC:DMC=10:20:70 in term of the accumulation amount. The content of the electrolyte salt in the solvent was 1.0 mol/kg.

The secondary battery was assembled by the following procedure. An aluminum lead was first ultrasonic-welded to one end of the positive-electrode current collector. A nickel lead was welded to one end of the negative-electrode current collector. The positive electrode, a separator, the negative electrode, a separator were then stacked in this order and wound in a longitudinal direction to obtain a wound electrode body. The end of the wounded part was fixed by a PET protecting tape. The separators were a 12 μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The adjusted electrolyte was poured from an open side to perform the impregnation of the electrolyte under a vacuum. The open side was stuck by heat sealing.

Examples 1-2 to 1-6

A secondary battery was produced as in example 1-1 except that the conditions of the carbon coating on the silicon compound were adjusted. Examples 1-2 to 1-6 obtained different carbon-coated silicon compounds having different $C_xH_z$ fragments detected in TOF-SIMS, different zeta potentials, and different ratios D/E where D was the $C_4H_9$ detected intensity and E was the $C_3H_5$ detected intensity in TOF-SIMS. The conditions of the carbon coating were adjusted by adjusting the CVD temperature and the gas species used when the silicon compound was subjected to the thermal CVD. In example 1-2, the conditions of the carbon coating were adjusted by firing the negative electrode active material particles at 1150° C. after the thermal CVD, in addition to the adjustment of the gas species used in the thermal CVD and the CVD temperature.

Comparative Examples 1-1 and 1-2

A secondary battery was produced as in example 1-1 except that the silicon compound was not coated with a carbon coating. In comparative example 1-2, the silicon compound having no carbon coating was fired in an ammonia gas.

Comparative Example 1-3

A secondary battery was produced as in example 1-1 except that after coating the silicon compound with a carbon coating, the silicon compound was fired in an ammonia gas such that negative electrode active material particles had a positive zeta potential.

The silicon compounds in examples 1-1 to 1-6 and comparative examples 1-1 to 1-3 had the following physical properties: the silicon compounds were $SiO_x$ having a median diameter $D_{50}$ of 5 μm where x=0.9; the half width (2θ) of the diffraction peak attributable to an Si(111) crystal face and obtainable by X-ray diffraction was 1.85°; the crystallite size attributable to the crystal face was 4.62 nm; the silicon compounds had a peak area ratio $A(a-Si)/C(SiO_2)$ of 0.769, obtained by $^{29}Si$-MAS-NMR spectrum, and a peak area ratio $B(c-Si)/C(SiO_2)$ of 0.5. The ratio A/B was 1.538; the ratio (A+B)/C was 1.269.

The cycle performance (the capacity maintenance rate %) and the first charge and discharge efficiency (the first efficiency %) of the secondary batteries in examples 1-1 to 1-6 and comparative examples 1-1 to 1-3 were investigated. The result is given in Table 1.

The cycle performance was investigated in the following manner: First, two cycles of charging and discharging were performed at 25° C. to stabilize the battery and the discharge capacity in the second cycle was measured. Next, the cycle of charging and discharging was repeated until the total number of cycles reached 100 cycles and the discharge capacity was measured every cycle. Finally, a capacity maintenance rate % (simply referred to as a maintenance rate below) was calculated by dividing the discharge capacity in the 100-th cycle by the discharge capacity in the second cycle and multiply the resultant by 100. The cycle conditions were as follows: The secondary batteries were charged with a constant current of 2.5 mA/cm² until the voltage reached 4.3V. After this voltage reached 4.3V, the charging was continued while the current density became 0.25 mA/cm² at 4.3V. The batteries were then discharged with a constant current density of 2.5 mA/cm² until the voltage reached 3.0V.

The first charge and discharge efficiency was calculated by the following expression:

Initial Efficiency (%)=(First Discharge Capacity/First Charge Capacity)×100

The atmosphere temperate was the same as the cycle performance was investigated. The charging and discharging conditions were 0.2 times the conditions of the investigation of the cycle performance.

Tables 1 to 8 show the maintenance rate and initial efficiency of the batteries using as the negative electrode active material the silicon compound containing no carbon active material, such as natural graphite (having an average diameter of 20 μm, for example). In other words, the maintenance rate and initial efficiency of the silicon compound $SiO_x$ itself are shown in Tables 1 to 8. This initial efficiency allowed the observation of variation in initial efficiency depending only on differences of $SiO_x$ such as differences in production procedure, crystallinity, and median diameter.

TABLE 1

SiOx(x = 0.9), D50 = 5 μm, polyimide, half width 2θ = 1.85, Si(111) crystallite 4.62 nm
NMR A(a-Si)/C(SiO2) = 0.769, B(c-Si)/C(SiO2) = 0.5
FEC:EC:DMC (1:2:7 vol %) LIPF6 1.2 mol/kg, Positive Electrode LiCoO2

| | Contained CyHz | | Intensity Ratio | Zeta Potential | Carbon Coating Content | CDV | CVD Tem- | Post-CVD Treat- | Mainte-nance | Initial Efficiency |
|---|---|---|---|---|---|---|---|---|---|---|
| | y | z | D/E | (mV) | % | Gas | perature | ment | Rate % | % |
| Comparative Example 1-1 | — | — | — | −10 | 0 | — | — | — | 61.3 | 58.2 |
| Comparative Example 1-2 | — | — | — | 10 | 0 | — | — | Firing in NH3 | 58.2 | 57.5 |
| Example 1-1 | 2, 3, 4 | 2y − 2, 2y, 2y + 2 | 0.8 | −50 | 5 | methane | 1000° C. | Firing at 1000° C. | 80.1 | 68 |
| Example 1-2 | 2, 3, 4 | 2y − 2, 2y, 2y + 2 | 0.8 | −250 | 5 | methane | 1000° C. | Firing at 1150° C. | 78.2 | 67.9 |
| Example 1-3 | 2, 3, 4, 5 | 2y − 2, 2y, 2y + 2 | 0.65 | −20 | 5 | propane | 900° C. | — | 79.8 | 67.7 |
| Example 1-4 | 2, 3, 4, 5, 6 | 2y − 2, 2y, 2y + 2 | 0.58 | −10 | 5 | butadiene | 900° C. | — | 78.5 | 66.8 |
| Comparative Example 1-3 | 2, 3, 4, 5 | 2y − 2, 2y, 2y + 2 | 0.61 | 10 | 5 | methane | 900° C. | Firing in NH3 | 76.5 | 62.5 |
| Example 1-5 | 2, 3, 4, 5 | 2y − 2, 2y, 2y + 2 | 1.2 | −10 | 5 | ethylene | 900° C. | — | 77 | 65.2 |
| Example 1-6 | 2, 3, 4, 5 | 2y − 2, 2y, 2y + 2 | 2.6 | −5 | 5 | methane | 850° C. | — | 76.8 | 64.1 |

As shown in Table 1, comparative examples 1-1 and 1-2, in which the particles contained no $C_yH_z$ compound in their outermost surface layer, demonstrated the degradation of the battery performances. The inventors believe that the reason is that the negative electrode containing no carbon coating degraded its electrical conductivity.

Every example in which the $C_yH_z$ compound where y<6 was contained demonstrated better battery performances. The inventors believe that the reason is that the particles containing lots of fragments having a y-value of less than 6 had a smaller surface-electrical-resistance. Every example in which the detected intensity ratio D/E was in the range from 0.3 to 2.5 demonstrated better battery performances.

Comparative Example 1-3 in which the zeta potential was positive demonstrated that the degradation of the battery performances because the silicon compound particles and the carbon active material were easy to cohere into a lump in the negative electrode slurry.

Every example in which the zeta potential was in the range from −200 mV to −0.1 mV demonstrated that the battery performances were much better because unevenness of the composition of the negative electrode was hard to occur.

Examples 2-1 to 2-4, and Comparative Examples 2-1 and 2-2

The amount of oxygen (the value of x) of the silicon compound expressed by a general formula of $SiO_x$ was adjusted as shown in Table 2. The amount of oxygen was adjusted by changing the temperature and the ratio of raw materials to be vaporized for the silicon compound.

TABLE 2

| Table 2 | SiOx(X=) | Maintenance Rate % | Initial Efficiency % |
|---|---|---|---|
| Comparative Example 2-1 | 0.3 | 64.4 | 75.0 |
| Example 2-1 | 0.5 | 76.8 | 72.2 |
| Example 2-2 | 0.7 | 78.2 | 70.1 |
| Example 1-1 | 0.9 | 80.1 | 68.0 |
| Example 2-3 | 1.2 | 80.1 | 67.7 |
| Example 2-4 | 1.6 | 80.2 | 67.2 |
| Comparative Example 2-2 | 1.8 | — | — |

TOF-SIMS $C_yH_z$ y = 2, 3, 4 z = 2y − 3, 2y − 1, 2y + 1 D(C4H9)/E(C3H5) = 0.8
Zeta Potential = −50 mV, D50 = 5 μm, polyimide, half width 2θ = 1.85, Si(111) crystallite 4.62 nm
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

As shown in Table 2, comparative examples in which the x value of the silicon compound expressed by $SiO_x$ was out of 0.5≤x≤1.6 demonstrated the degradation of the battery performances. In comparative example 2-1, for example, although the initial efficiency was improved because of lack of the oxygen amount (x=0.3), the maintenance rate significantly degraded. In comparative example 2-2, on the other hand, the measurement was impossible because both the maintenance rate and initial efficiency degraded due to reduction in conductivity caused by a large amount of oxygen (x=1.8).

Examples 3-1 to 3-7

A secondary battery was produced as in example 1-2 except that the ratio of $SiO_x$ in the silicon compound and the degree of disproportionation of the $SiO_x$ material. The ratio of $SiO_x$ was changed in the same manner as in examples 2-1 to 2-4 and comparative examples 2-1 and 2-2. The ratio A/B in the silicon compound ($SiO_x$) was changed by a heat treatment to control the degree of disproportionation, where A was the peak area of an amorphous silicon (a-Si) region represented by a chemical shift value of −20 ppm to −74 ppm, B was the peak area of a crystalline silicon (c-Si) region represented by a chemical shift value of −75 ppm to −94 ppm. The chemical shift value was obtained from a $^{29}$Si-MAS-NMR spectrum.

TABLE 3

| | NMR | | | |
|---|---|---|---|---|
| Table 3 | A/B (a-Si/c-Si) | (A + B)/C (Si/SiO2) | Maintenance Rate % | Initial Efficiency % |
| Example 3-1 | 0.3 | 6.2 | 76.5 | 69.2 |
| Example 3-2 | 0.002 | 1.5 | 78.8 | 67.1 |
| Example 3-3 | 0.6 | 0.32 | 80.1 | 68.0 |
| Example 3-4 | 0.769 | 0.32 | 80.3 | 67.7 |
| Example 3-5 | 1.6 | 0.33 | 80.0 | 67.2 |
| Example 3-6 | 5.5 | 0.42 | 77.3 | 68.5 |
| Example 3-7 | 0.54 | 0.01 | 76.9 | 66.2 |

TOF-SIMS $C_yH_z$ y = 2, 3, 4 z = 2y − 3, 2y − 1, 2y + 1 D(C4H9)/E(C3H5) = 0.8
Zeta Potential = −50 mV, SiOx(x = 0.9), D50 = 5 μm, polyimide, half width 2θ = 1.85, Si(111) crystallite 4.62 nm
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

In examples 3-1 to 3-7, when the A/B ratio (a-Si/c-Si) in the $SiO_x$ (x=0.9) was in the range of 5.0≥A/B≥0.01, bath the maintenance rate and initial efficiency were better. The reason is that an increase in a-Si component reduced the initial efficiency and improved the maintenance rate, thereby balancing the rate within the above range. The silicon compound ($SiO_x$) having a ratio (A+B)/C of 6 or less, where A+B was the peak area of the Si region and C was the peak area of the $SiO_2$ region, can inhibit its expansion due to the insertion of lithium and hence reduction in the maintenance rate. When the ratio (A+13)/C was in the range from 0.02 to 6, the reduction in conductivity was inhibited and the maintenance rate and initial efficiency were better.

Examples 4-1 to 4-4

A secondary battery was produced as in example 1-2 except that the status of the surface of the silicon compound was adjusted to change the spectrum of the C1s orbital measured in XPS. The result is given in Table 4. The status of the surface was adjusted by adjusting the amount of the oxygen supplied in the CVD and the CVD temperature.

TABLE 4

| Table 4 | XPS C1s F(C=O)/G(C=C) | Maintenance Rate % | Initial Efficiency % |
|---|---|---|---|
| Example 4-1 | 4.2 | 78.1 | 67.3 |
| Example 4-2 | 1.62 | 78.9 | 67.7 |
| Example 4-3 | 0.33 | 80.1 | 68.0 |
| Example 4-4 | 0.02 | 77.1 | 66.1 |

TOF-SIMS $C_yH_z$ y = 2, 3, 4 z = 2y − 3, 2y − 1, 2y + 1 D(C4H9)/E(C3H5) = 0.8
Zeta Potential = −50 mV, SiOx(x = 0.9), D50 = 5 μm, polyimide, half width 2θ = 1.85, Si(111) crystallite 4.62 nm
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

As shown in Table 4, when the ratio F/G was 3.0 or less, the degradation of the electrical conductivity and the reduction in the maintenance rate were inhibited because the functional group including C=O bond covering the surface was prevented from increasing too much. When the ratio A/B was 0.05 or more, the degradation of the maintenance rate and initial efficiency was inhibited because the reduction in lithium ionic conductivity of the silicon compound surface layer was inhibited.

Examples 5-1 to 5-4

A secondary battery was produced as in example 1-2 except that the status of the surface of the negative electrode material was adjusted to change the intensity ratio $I_{1330}/I_{1580}$ of the scattering peaks at 1330 cm$^{-1}$ and 1580 cm$^{-1}$ measured in the Raman spectrometry. The result is given in Table 5. The intensity ratio of the scattering peaks was adjusted by changing the temperature and the pressure of gas in the CVD.

TABLE 5

| Table 5 | $I_{1330}/I_{1580}$ | Maintenance Rate % | Initial Efficiency % |
| --- | --- | --- | --- |
| Example 5-1 | 2.2 | 77.8 | 67.1 |
| Example 5-2 | 1.2 | 80.1 | 68.0 |
| Example 5-3 | 0.85 | 77.1 | 68.2 |
| Example 5-4 | 0.6 | 76.9 | 68.2 |

TOF-SIMS C$y$Hz y = 2, 3, 4 z = 2y − 3, 2y − 1, 2y + 1 D(C4H9)/E(C3H5) = 0.8
Zeta Potential = −50 mV, SiOx(x = 0.9), D50 = 5 μm, polyimide, half width 2θ = 1.85, Si(111) crystallite 4.62 nm
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

As shown in Table 5, when the ratio $I_{1330}/I_{1580}$ in the Raman spectrometry was less than 2.0, the degradation of the maintenance rate and initial efficiency was inhibited because the particles did not have too many carbon components having disordered bond attributable to $I_{1330}$ on their surface and prevented the reduction in electrical conductivity. When the ratio $I_{1330}/I_{1580}$ was more than 0.7, the reduction in the maintenance rate was inhibited because the particles did not have too many carbon components such as graphite attributable to $I_{1580}$ on their surface and inhibited the degradation of the ionic conductivity, and the carbon coating was expandable corresponding to the expansion of the silicon compound due to the insertion of lithium.

Examples 6-1 to 6-6

A secondary battery was produced as in example 1-2 except that the crystallinity of the silicon compound was changed. The crystallinity can be changed by a heat treatment under a non-atmospheric condition.

Table 6 shows the half width (2θ) of a diffraction peak attributable to an Si(111) crystal face and obtained when X-ray diffraction is performed on the silicon compound, and the crystallite size attributable to the crystal face in these examples. Although example 6-1 exhibits a crystallite size of 1.542, this value was obtained by fitting with analysis software because the peak value was not obtained. The silicon compound in examples 6-1 was substantially amorphous. The cycle performance and the first charge and discharge efficiency of the secondary batteries in examples 6-1 to 6-6 were investigated. The result is given in Table 6.

TABLE 6

| Table 6 | Half Width 2θ (°) | Crystallite Size (nm) | Maintenance Rate % | Initial Efficiency % |
| --- | --- | --- | --- | --- |
| Example 6-1 | 10.123 | 1.542 | 80.5 | 67.7 |
| Example 6-2 | 2.257 | 3.77 | 80.4 | 67.8 |
| Example 6-3 | 1.845 | 4.62 | 80.1 | 68.0 |
| Example 6-4 | 1.271 | 6.63 | 79.7 | 68.2 |
| Example 6-5 | 0.796 | 10.84 | 79.2 | 68.3 |
| Example 6-6 | 0.756 | 11.42 | 78.8 | 68.6 |

TOF-SIMS C$y$Hz y = 2, 3, 4 z = 2y − 3, 2y − 1, 2y + 1 D(C4H9)/E(C3H5) = 0.8
Zeta Potential = −50 mV, SiOx(x = 0.9), D50 = 5 nm, polyimide
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

As shown in Table 6, the maintenance rate and initial efficiency changed in response to the variation in the crystallinity of the silicon compound. In particular, a high capacity maintenance rate and a high initial efficiency were obtained by low crystallinity materials with a crystallite size of 7.5 nm or less and a diffraction peak having a half width (2θ) of 1.2° or more, which is attributable to an Si(111) crystal face. Example 6-1 demonstrated that the best battery performances were obtained when the silicon compound was substantially amorphous.

Examples 7-1 to 7-5

A secondary battery was produced as in example 1-2 except that the median diameter of the silicon compound was adjusted. The median diameter was adjusted by changing pulverization time and classify conditions in production of the silicon compound. The cycle performance and the first charge and discharge efficiency of the secondary batteries in examples 7-1 to 7-5 were investigated. The result is given in Table 7.

TABLE 7

| Table 7 | Median Diameter | Maintenance Rate % | Initial Efficiency % |
| --- | --- | --- | --- |
| Example 7-1 | 1.3 | 80.2 | 67.6 |
| Example 7-2 | 5.1 | 80.0 | 68.0 |
| Example 7-3 | 8.1 | 79.9 | 67.8 |
| Example 7-4 | 12.3 | 79.1 | 67.4 |
| Example 7-5 | 31.1 | 78.3 | 66.9 |

TOF-SIMS C$y$Hz y = 2, 3, 4 z = 2y − 3, 2y − 1, 2y + 1 D(C4H9)/E(C3H5) = 0.8
Zeta Potential = −50 mV, SiOx(x = 0.9), polyimide, half width 2θ = 1.85, Si(111) crystallite 4.62 nm
Carbon Coating Content Ratio 5%, Carbon Coating Average Thickness 100 nm, Carbon Coating Average Coverage 90%
FEC:EC:DMC(1:2:7 vol %) LIPF6 1.2 mol/kg, Positive Electrode LiCoO2

As shown in Table 7, the maintenance rate and initial efficiency changed in response to the variation in the median diameter of the silicon compound. Examples 7-1 to 7-5 demonstrated that the maintenance rate and initial efficiency were higher when the median diameter of the silicon compound was in the range from 0.5 μm to 20 μm. In particular, a better maintenance rate was obtained when the median diameter was 6 μm or less.

Examples 8-1 to 8-5

A secondary battery was produced as in example 1-2 except that the amount, average thickness, average coverage of the carbon coating on the silicon compound were changed. The amount, thickness, and coverage of the carbon coating can be controlled by adjusting the CVD time and the fluidity of silicon compound powder in the CVD. Table 8 shows the content of the carbon coating with respect to the total amount of the silicon compound and the carbon coating, the average thickness of the carbon coating, and the average coverage of carbon coating.

The cycle performance and the first charge and discharge efficiency of the secondary batteries in examples 8-1 to 8-5 were investigated. The result is given in Table 8.

TABLE 8

| Table 8 | Carbon Coating Content Ratio % | Carbon Coating Average Thickness (nm) | Average Coverage % | Maintenance Rate % | Initial Efficiency % |
|---|---|---|---|---|---|
| Example 8-1 | 2 | 30 | 30 | 78.8 | 66.1 |
| Example 8-2 | 5 | 100 | 90 | 80.0 | 68.0 |
| Example 8-3 | 10 | 160 | 100 | 79.9 | 67.8 |
| Example 8-4 | 20 | 300 | 100 | 79.6 | 67.6 |
| Example 8-5 | 50 | 800 | 100 | 78.5 | 67.5 |

TOF-SIMS $C_yH_z$ y = 2, 3, 4 z = 2y − 3, 2y − 1, 2y + 1 D(C4H9)/E(C3H5) = 0.8

Zeta Potential = −50 mV, SiOx (x = 0.9), D50 = 5 μm, polyimide, half width 2θ = 1.85, Si(111) crystallite 4.62 nm FEC:EC:DMC(1:2:7 vol %) LIPF6 1.2 mol/kg, Positive Electrode LiCoO2

As shown in Table 8, the maintenance rate and initial efficiency were better when the content of the carbon coating was in the range from 5% to 20%. The reason why the better maintenance rate and initial efficiency were obtained particularly when the content was in the above range is that when the content of the carbon coating is 5% or more, the electrical conductivity of the silicon compound can be improved and when the content is 20% or less, the degradation of the ionic conductivity can be prevented.

Examples 9-1 to 9-6

Examples 9-1 to 9-6 used a negative electrode material containing the silicon compound and a carbon active material. The carbon active material used was natural graphite having a median diameter $D_{50}$ of 5 μm.

A secondary battery was produced as in example 1-3 except that the content ratio of the silicon compound to the carbon active material in the negative electrode, the percentage of the silicon compound in the entire active material, was changed, and a binder to be used was determined according to the ratio.

Comparative Example 9-1

A secondary battery was produced as in example 1-2 except that a negative electrode material used was composed of a carbon active material and contained no silicon compound and a NCA (lithium nickel cobalt aluminum complex oxide) positive electrode material was used. Since the positive electrode material was thus changed, the cycle performance and the first charge and discharge efficiency were evaluated at a discharging cutoff voltage of 2.5V Table 9 shows the result of the investigated cycle performance and first charge and discharge efficiency of the secondary batteries in examples 9-1 to 9-6 and comparative example 9-1.

TABLE 9

| Table 9 | Silicon compound-to-active material Ratio | Relative Volume Capacity Density | Maintenance Rate % | Initial Efficiency % | Binder |
|---|---|---|---|---|---|
| Comparative Example 9-1 | 0 | 1 | 94.1 | 89.8 | SBR/CMC |
| Example 9-1 | 0.04 | 1.03 | 90.3 | 85.7 | SBR/CMC |
| Example 9-2 | 0.05 | 1.04 | 90 | 84.9 | SBR/CMC |
| Example 9-3 | 0.1 | 1.08 | 87 | 81.5 | SBR/CMC |
| Example 9-4 | 0.25 | 1.13 | 86.2 | 75.7 | PI |
| Example 9-5 | 0.5 | 1.17 | 85.3 | 71.4 | PI |
| Example 9-6 | 1 | 1.18 | 84.9 | 68 | PI |

TOF-SIMS $C_yH_z$ y = 2, 3, 4 z = 2y − 3, 2y − 1, 2y + 1 D(C4H9)/E(C3H5) = 0.8

Zeta Potential = −50 mV, SiOx(x = 0.9), D50 = 5 μm, polyimide, half width 2θ = 1.85, Si(111) crystallite 4.62 nm Carbon Coating Content Ratio 5%, Carbon Coating Average Thickness 100 nm, Carbon Coating Average Coverage 90%

NMR A(a-Si)/C(SiO2) = 0.769, B(c-Si)/C (SiO2) = 0.5, Natural Graphite (d50 = 20 um)

FEC:EC:DMC(1:2:7 vol %) LIPF6 1.2 mol/kg, Positive Electrode LiCoO2

As understood from Table 9, the increase in the percentage of the silicon compound increased the capacity of the negative electrode but reduced the initial efficiency and the maintenance rate. The relative volume capacity density in Table 9 is represented by a relative value referenced to the volume capacity density in comparative example 9-1. The reduction in the percentage of the silicon compound improved the initial efficiency and maintenance rate but reduced the capacity density. In particular, comparative example 9-1 in which the carbon active material alone was used as the negative electrode material failed to obtain a lithium-ion secondary battery having a higher volume capacity density.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A negative electrode material for a non-aqueous electrolyte secondary battery, comprising
negative electrode active material particles containing a silicon compound expressed by $SiO_x$ at least partially coated with a carbon coating where 0.5≤x≤1.6, the negative electrode active material particles having a negative zeta potential ranging from −200 mV to −0.1 mV, and exhibiting fragments of $C_yH_z$ compound in an outermost surface layer of the silicon compound when subjected to Time-of-Flight Secondary Ion Mass Spectrometry (TOF-SIMS),
wherein a part of the fragments of $C_yH_z$ compound exhibited by the negative electrode active material particles during the TOF-SIMS satisfies 6≥y≥2 and 2y+2≥z≥2y−2.

2. The negative electrode material for a non-aqueous electrolyte secondary battery according to claim 1, wherein the negative electrode active material particles have a negative zeta potential ranging from −100 mV to −5 mV.

3. The negative electrode material for a non-aqueous electrolyte secondary battery according to claim 1, wherein a ratio of a $C_4H_9$ detected intensity D to a $C_3H_5$ detected intensity E of the fragments of $C_yH_z$ compound exhibited by the negative electrode active material particles during the TOF-SIMS satisfies 2.5≥D/E≥0.3.

4. The negative electrode material for a non-aqueous electrolyte secondary battery according to claim 1, wherein the silicon compound satisfies formula (1) of $5.0 \geq A/B \geq 0.01$ and $6.0 \geq (A+B)/C \geq 0.02$ where A is a peak area of an amorphous silicon region represented by a chemical shift value of −20 ppm to −74 ppm, B is a peak area of a crystalline silicon region represented by a chemical shift value of −75 ppm to −94 ppm, and C is a peak area of a silica region represented by a chemical shift value of −95 ppm to −150 ppm, the chemical shift value being obtained from a $^{29}$Si-Magic Angle Spinning (MAS)-Nuclear Magnetic Resonance (NMR) spectrum.

5. The negative electrode material for a non-aqueous electrolyte secondary battery according to claim 1, wherein each negative electrode active material particle satisfies $3.00 \geq F/G \geq 0.05$ when subjected to X-ray photoelectron spectroscopy (XPS) on its surface layer where F is a peak area of a peak when a C1s orbital binding energy attributable to C=O bond is about 287.5±1.0 eV, and G is a peak area of a peak when a C1s orbital binding energy attributable to C=C bond is about 284.0±1.0 eV.

6. The negative electrode material for a non-aqueous electrolyte secondary battery according to claim 1, wherein the carbon coating on the silicon compound exhibits scattering peaks at 1330 cm$^{-1}$ and 1580 cm$^{-1}$ in Raman spectrometry and satisfies $0.7 < I_{1330}/I_{1580} < 2.0$ where $I_{1330}/I_{1580}$ is a ratio of an intensity of the scattering peak at 1330 cm$^{-1}$ to that at 1580 cm$^{-1}$.

7. The negative electrode material for a non-aqueous electrolyte secondary battery according to claim 1, wherein the silicon compound exhibits a diffraction peak having a half width (2θ) of 1.2° or more, the diffraction peak being attributable to an Si(111) crystal face and obtained when X-ray diffraction is performed on the silicon compound, and a crystallite size attributable to the crystal face is 7.5 nm or less.

8. The negative electrode material for a non-aqueous electrolyte secondary battery according to claim 1, wherein the negative electrode active material particles have a median diameter ranging from 0.5 μm to 20 μm.

9. The negative electrode material for a non-aqueous electrolyte secondary battery according to claim 1, wherein an amount of the carbon coating is 20 mass % or less with respect to the total amount of the silicon compound and the carbon coating.

10. The negative electrode material for a non-aqueous electrolyte secondary battery according to claim 1, wherein an average thickness of the carbon coating on the silicon compound is in the range from 1 nm to 5000 nm.

11. The negative electrode material for a non-aqueous electrolyte secondary battery according to claim 1, wherein an average thickness of the carbon coating on the silicon compound is in the range from 5 nm to 500 nm.

12. The negative electrode material for a non-aqueous electrolyte secondary battery according to claim 1, wherein an average coverage of the carbon coating on the silicon compound is 30% or more.

13. The negative electrode material for a non-aqueous electrolyte secondary battery according to claim 1, wherein the carbon coating is formed by pyrolyzing a compound containing carbon.

14. A negative electrode active material layer for a non-aqueous electrolyte secondary battery, comprising a negative electrode material according to claim 1 and a carbon material contained in the negative electrode material.

15. A negative electrode for a non-aqueous electrolyte secondary battery, comprising a negative electrode material according to claim 1.

16. A non-aqueous electrolyte secondary battery using a negative electrode according to claim 15.

17. A method of producing a negative electrode material for a non-aqueous electrolyte secondary battery, according to claim 1, the negative electrode material comprising negative electrode active material particles containing a silicon compound expressed by SiO$_x$ at least partially coated with a carbon coating where $0.5 \leq x \leq 1.6$, the method comprising:
producing carbon-coated silicon compounds by performing thermal chemical vapor deposition (CVD) on silicon compounds expressed by SiO$_x$ where $0.5 \leq x \leq 1.6$;
evaluating whether the carbon-coated silicon compounds exhibit fragments of C$_y$H$_z$ compound in their outermost surface layer when subjected to Time-of-Flight Secondary Ion Mass Spectrometry (TOF-SIMS);
measuring a zeta potential of the carbon-coated silicon compounds;
selecting a carbon-coated silicon compound exhibiting the fragments of C$_y$H$_z$ compound in its outermost surface layer in the evaluation and a negative zeta potential in the measurement from the produced carbon-coated silicon compounds; and
using the selected carbon-coated silicon compound for the negative electrode active material particles to produce the negative electrode material.

18. The method of producing a negative electrode material for a non-aqueous electrolyte secondary battery according to claim 17, wherein a gas species to be used and temperature in the thermal CVD are adjusted such that the carbon-coated silicon compound exhibiting the fragments of C$_y$H$_z$ compound in its outermost surface layer when subjected to TOF-SIMS and having a negative zeta potential is produced.

* * * * *